(12) United States Patent
Suzuki et al.

(10) Patent No.: US 8,077,924 B2
(45) Date of Patent: Dec. 13, 2011

(54) IMAGE PROCESSING APPARATUS AND IMAGE PROCESSING METHOD

(75) Inventors: Shingo Suzuki, Akishima (JP); Hirofumi Mori, Koganei (JP); Masami Morimoto, Fuchu (JP); Tatsunori Saito, Sagamihara (JP)

(73) Assignee: Kabushiki Kaisha TOSHIBA, Tokyo (JP)

( * ) Notice: Subject to any disclaimer, the term of this patent is extended or adjusted under 35 U.S.C. 154(b) by 773 days.

(21) Appl. No.: 12/199,422

(22) Filed: Aug. 27, 2008

(65) Prior Publication Data
US 2009/0279799 A1 Nov. 12, 2009

(30) Foreign Application Priority Data

May 9, 2008 (JP) .................................. 2008-123905

(51) Int. Cl.
*G06K 9/00* (2006.01)
*H04N 11/02* (2006.01)
*H04N 5/14* (2006.01)

(52) U.S. Cl. .................... 382/107; 348/699; 375/240.16

(58) Field of Classification Search .................. 382/107, 382/236, 284, 294; 348/416.1, 538, 699; 358/525; 704/265; 708/290, 313, 847; 375/240.15, 375/240.16

See application file for complete search history.

(56) References Cited

U.S. PATENT DOCUMENTS 5,581,309 A * 12/1996 Okino et al. ................... 348/699
6,205,259 B1 * 3/2001 Komiya et al. ............... 382/284

FOREIGN PATENT DOCUMENTS

JP 2004-112229 A 4/2004

* cited by examiner

*Primary Examiner* — Abolfazl Tabatabai
(74) *Attorney, Agent, or Firm* — Holtz, Holtz, Goodman & Chick, PC

(57) ABSTRACT

An edge map generator/edge weighting coefficient generator performs edge detection for respective blocks that compose a moving image frame Ft, and calculates correlations between the edges of the respective blocks and those of neighboring blocks as edge weighting coefficients. A predictive vector candidate determination unit calculates a plurality of motion vector candidates for each block based on this edge weighting coefficient. Of these candidates, a motion vector detector obtains a candidate with a small evaluation value based on prediction errors and motion vector cost as a motion vector, thereby generating an interpolation frame Ft−0.5.

14 Claims, 12 Drawing Sheets

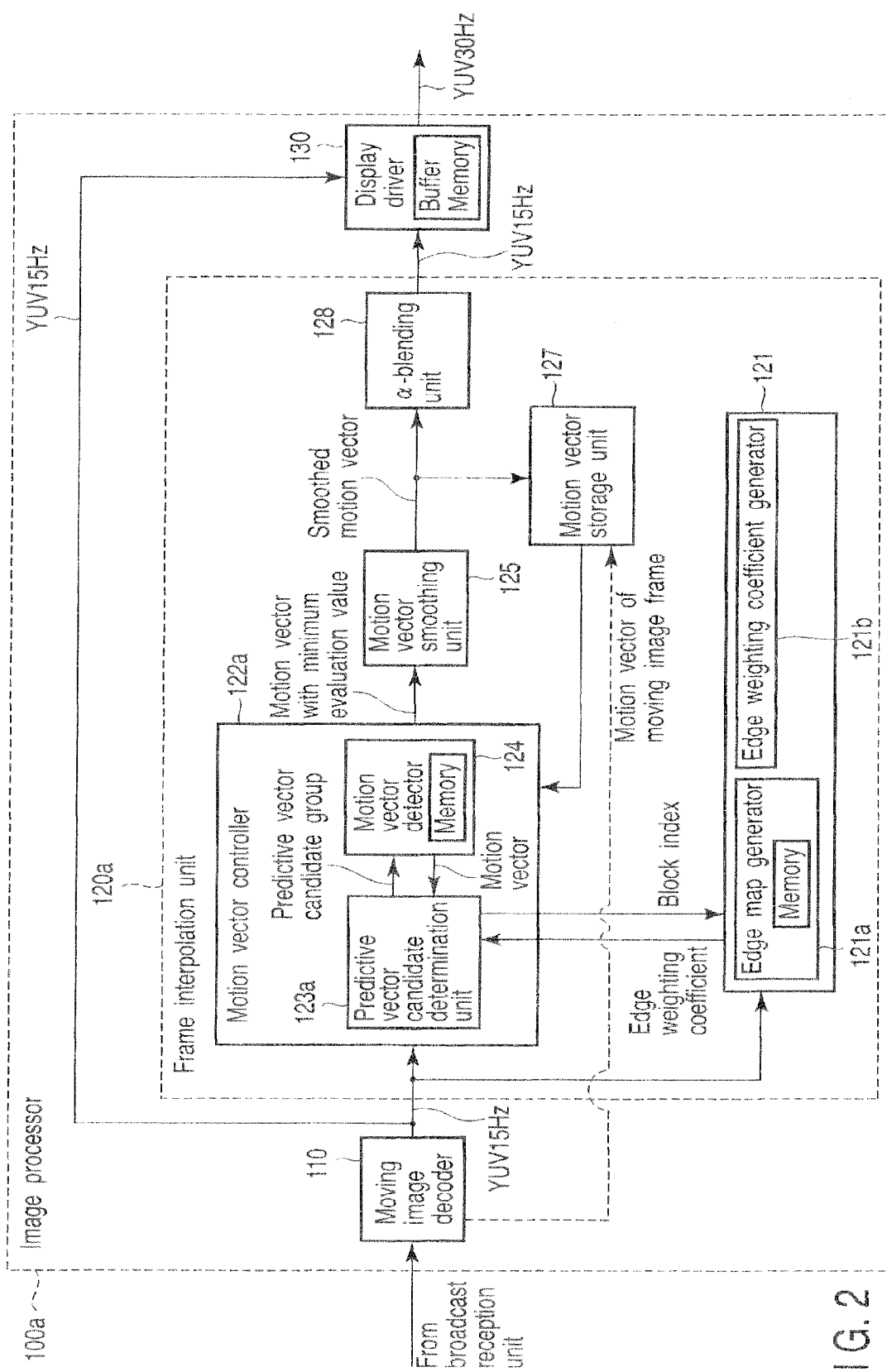
F I G. 2

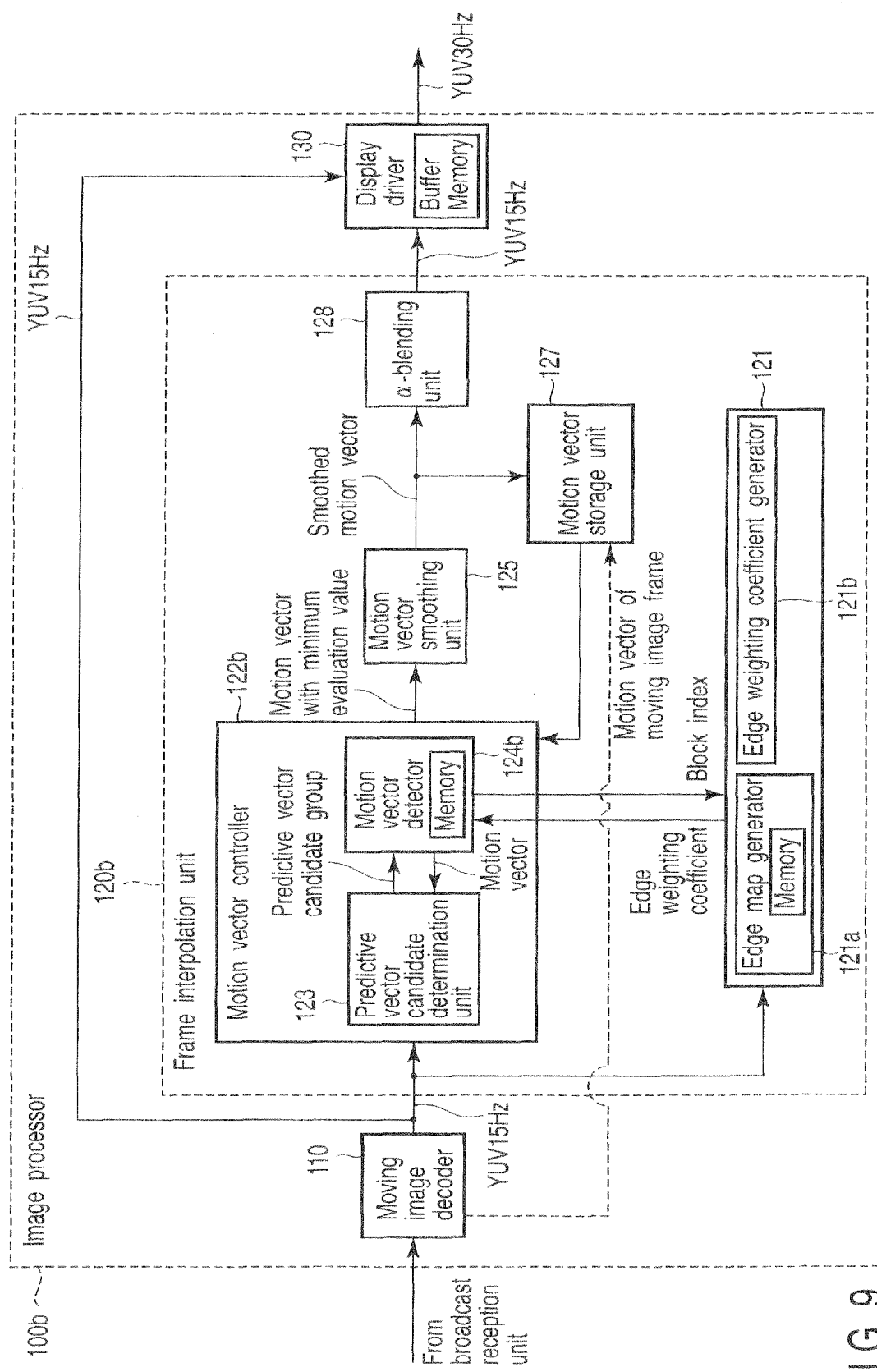
F I G. 9

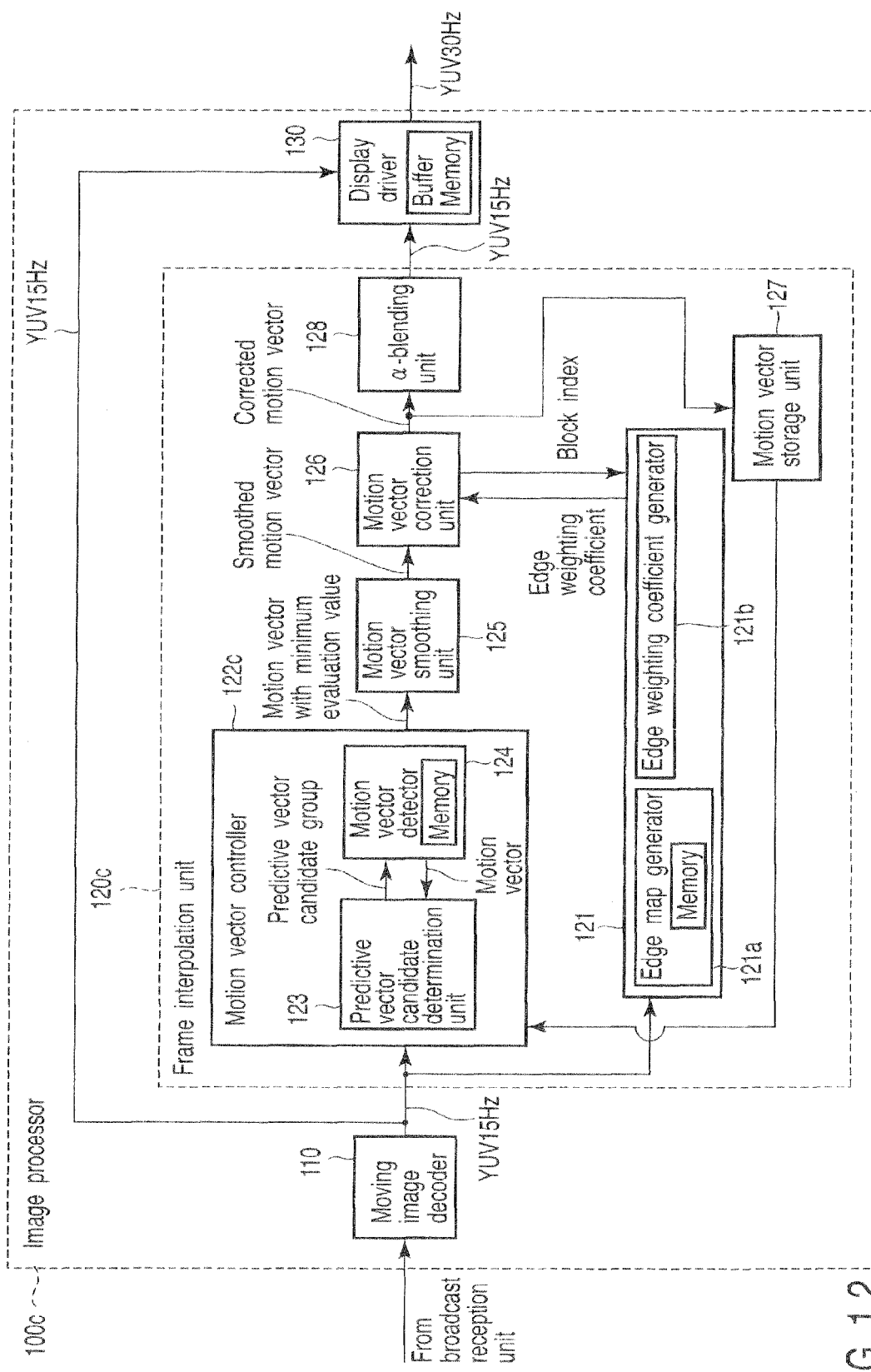
F I G. 12

US 8,077,924 B2

IMAGE PROCESSING APPARATUS AND IMAGE PROCESSING METHOD

CROSS-REFERENCE TO RELATED APPLICATIONS

This application is based upon and claims the benefit of priority from prior Japanese Patent Application No. 2008-123905, filed May 9, 2008, the entire contents of which are incorporated herein by reference.

BACKGROUND OF THE INVENTION

1. Field of the Invention

The present invention relates to an image processing apparatus which improves the quality of a moving image.

2. Description of the Related Art

As is well-known, as a technique for increasing the number of display frames per unit time, a frame interpolation method is available. This frame interpolation method increases the number of display frames per unit time by predicting and interpolating, based on moving image frames as an input signal, interpolation frames that would exist between these frames. With this frame interpolation, the following advantages are obtained. That is, not only are frames connected smoothly, but also blurring of the display can be eliminated.

Jpn. Pat. Appln. KOKAI Publication No. 2004-112229 detects edge pixels in each interpolation block, and applies different motion vector corrections according to the edge detection result. Hence, the motion precision is very high, but the processing volume is large and is not suited to mobile devices.

The frame interpolation method adopted in a conventional image processing apparatus requires complicated processing stages. As a result, the load on a processor is heavy, and an application to mobile devices suffers many problems in terms of, e.g., processor performance and consumption power.

BRIEF SUMMARY OF THE INVENTION

The present invention has been made to solve the aforementioned problems, and has as its object to provide an image processing apparatus and image processing method, which can execute frame interpolation processing without imposing a heavy load on a processor, and are suited to mobile devices.

To achieve this object, the present invention is an image processing apparatus for generating an interpolation frame that interpolates between consecutive moving image frames. The image processing apparatus comprises a motion vector storage unit which stores motion vectors for respective blocks that configure an interpolation frame; an edge detection unit which detects edges for respective blocks that configure a moving image frame; a correlation detection unit which calculates correlations with the edges of neighboring blocks for respective blocks based on the edges detected by the edge detection unit; a candidate determination unit which determines motion vector candidates from the motion vectors stored in the motion vector storage unit based on the correlations detected by the correlation detection unit for each of the blocks that configure the interpolation frame; a motion vector detection unit which detects a motion vector of each of the blocks that compose the interpolation frame from the candidates determined by the candidate determination unit; and a control unit which records the motion vectors detected by the motion vector detection unit in the motion vector storage unit.

Therefore, according to the present invention, since an edge is detected for each block in place of pixels, the processing load can be reduced. Also, since motion vector candidates are calculated in consideration of the correlation with a neighboring block in association with the edge, thus providing an image processing apparatus and image processing method, which can attain frame interpolation processing with high precision.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 2 is a circuit block diagram showing the arrangement of the first embodiment of an image processing apparatus which is applied to the mobile wireless apparatus shown in FIG. 1;

FIG. 9 is a circuit block diagram showing the arrangement of the second embodiment of an image processing apparatus which is applied to the mobile wireless apparatus shown in FIG. 1;

FIG. 12 is a circuit block diagram showing the arrangement of the third embodiment of an image processing apparatus which is applied to the mobile wireless apparatus shown in FIG. 1;

DETAILED DESCRIPTION OF THE INVENTION

Embodiments of the present invention will be described hereinafter with reference to the accompanying drawings.

First Embodiment

Figure 1:
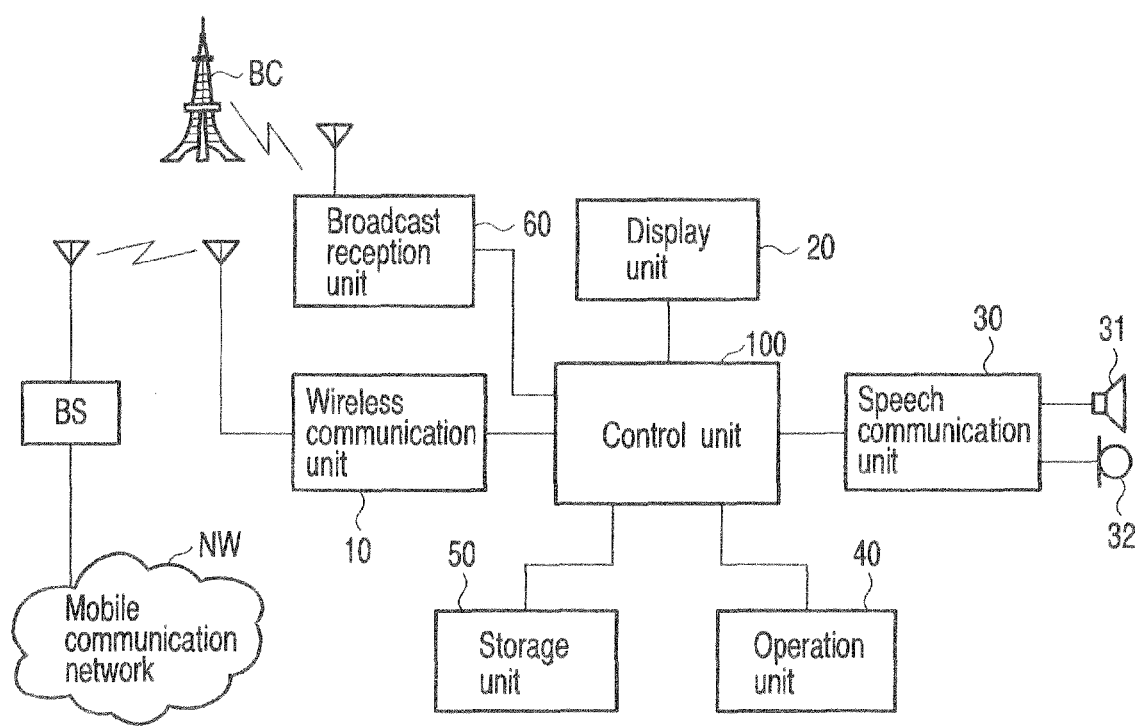
FIG. 1 is a circuit block diagram showing the arrangement of a mobile wireless apparatus to which an image processing apparatus according to the present invention is applied.

FIG. 1 is a block diagram showing the arrangement of a mobile wireless apparatus, such as a cellular phone and a personal computer, to which an image processing apparatus according to the first embodiment of the present invention is applied. As shown in FIG. 1, this mobile wireless apparatus comprises, as principal components, a control unit 100, wireless communication unit 10, display unit 20, speech communication unit 30, operation unit 40, storage unit 50, and broadcast reception unit 60. This apparatus has a function of making communications via a base station BS and mobile communication network NW, and a function of receiving a terrestrial digital broadcast signal transmitted from a broadcasting station BC.

The wireless communication unit 10 makes a wireless communication with the base station BS accommodated in the mobile communication network NW in accordance with an instruction from the control unit 100. With this wireless communication, the unit 10 exchanges audio data, e-mail data, and the like, and receives Web data, streaming data, and the like.

The display unit 20 is display means using, for example, a liquid crystal display (LCD), organic electroluminescent display, or the like. The unit 20 displays images (still and moving images), text information, and the like under the control of the control unit 100 to visually provide the user with information.

The speech communication unit 30 comprises a loudspeaker 31 and microphone 32. The unit 30 converts a user's speech input via the microphone 32 into audio data, and outputs the audio data to the control unit 100. Also, the unit 30 decodes audio data received from a communication partner or the like, and outputs the decoded data via the loudspeaker 31.

The operation unit 40 comprises a plurality of key switches and the like used to input characters, numerals, predetermined instructions, and the like, and accepts user's instructions via these switches.

The storage unit 50 stores a control program and control data of the control unit 100, application software, address data (phonebook data items) that associate the names, telephone numbers, e-mail addresses, and the like of communication partners with each other, exchanged e-mail data, Web data downloaded by Web browsing, and downloaded content data, and also temporarily stores streaming data and the like. More specifically, the storage unit 50 comprises one or a combination of an HDD, RAM, ROM, flash memory, and the like.

The broadcast reception unit 60 is a tuner which receives a terrestrial digital broadcast signal transmitted from the broadcasting station BC. For example, the unit 60 receives one segment of the broadcast signal to obtain broadcast data (encoded stream) generated by encoding a video signal in, e.g., a format of H.264 or the like.

The control unit 100 comprises a microprocessor, operates according to the control program and control data stored in the storage unit 50, and systematically controls the respective units of the mobile wireless apparatus to implement speech communications and data communications. The control unit 100 operates according to application software stored in the storage unit 50, and comprises a communication control function of exchanging e-mail data, attaining Web browsing, displaying a moving image on the display unit 20 based on downloaded streaming data, and making speech communications.

Furthermore, the control unit 100 comprises an image processor 100a. This image processor 100a decodes the broadcast data obtained by the broadcast reception unit 60, applies image processing to the decoding result, and displays the broadcast moving image on the display unit 20 by interpolating frames in those of the moving image. The image processor 100a comprises, for example, a moving image decoder 110, frame interpolation unit 120a, and display driver 130, as shown in, e.g., FIG. 2. In addition, the image processor 100a comprises an audio decoder (not shown) which decodes audio data received by the broadcast reception unit 60 to obtain a broadcast audio signal.

The moving image decoder 110 decodes encoded data (Video Elementary Stream) of a moving image, thereby obtaining moving image data including a plurality of moving image frames. Note that the frame rate of the moving image data obtained at that time is 15 frames per second. The moving image data is output to the frame interpolation unit 120a and display driver 130.

The moving image decoding processing by the moving image decoder 110 extracts, from the received encoded stream, information indicating a moving image frame to be referred to upon decoding encoded image data, encoded motion vectors, and the like, and decodes image data using them. The decoding processing composites the image data obtained by decoding and image data obtained from a reference image frame to obtain a moving image frame. Note that the description of this decoding processing corresponds to a case in which moving image frames are inter-encoded. However, when moving image frames are intra-encoded, since other frames need not be referred to, a moving image frame is obtained by decoding encoded image data.

The frame interpolation unit 120a generates an interpolation frame to be interpolated between a moving image frame Ft and an immediately preceding moving image frame Ft−1 obtained by the moving image decoder 110. In the following description, assume that the unit 120a generates an interpolation frame Ft−0.5, which is located at a temporally middle position between the frames Ft and Ft−1, as an example. The frame interpolation unit 120a comprises an edge map generator/edge weighting coefficient generator 121, motion vector controller 122a, motion vector smoothing unit 125, motion vector storage unit 127, and α-blending unit 128.

Figure 3:
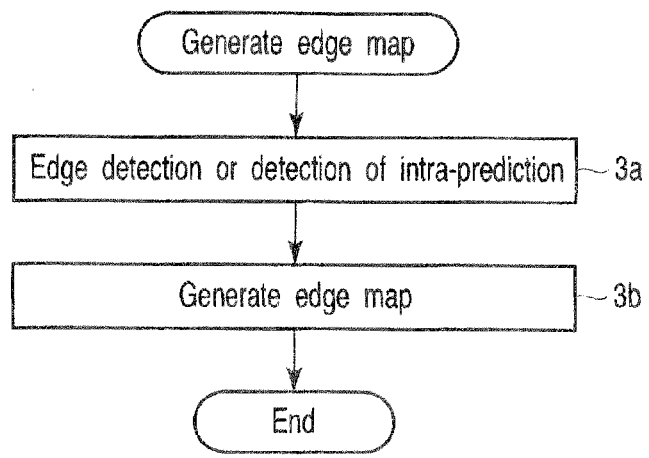
FIG. 3 is a flowchart for explaining the operation of an edge map generator/edge weighting coefficient generator of the image processing apparatus shown in FIG. 2.

Of the edge map generator/edge weighting coefficient generator 121, an edge map generator 121a executes processing, as shown in FIG. 3. More specifically, the edge map generator 121a divides the moving image frame Ft used as a reference frame into rectangular blocks. The edge map generator 121a executes edge detection in a raster scan order in turn from the upper left one of these divided blocks (step 3a), classifies the detected edges of the respective blocks into predetermined edge directions (for example, four directions obtained by dividing 360° by 90°), and records edge information each indicating the edge direction detected for each block in an internal memory of the edge map generator 121a, thereby generating an edge map (step 3b). Note that the edge map generator 121a stores the generated edge maps (edge information of respective blocks) for at least two consecutive frames (moving image frame Ft and immediately preceding moving image frame Ft−1) in the internal memory.

Figure 4:
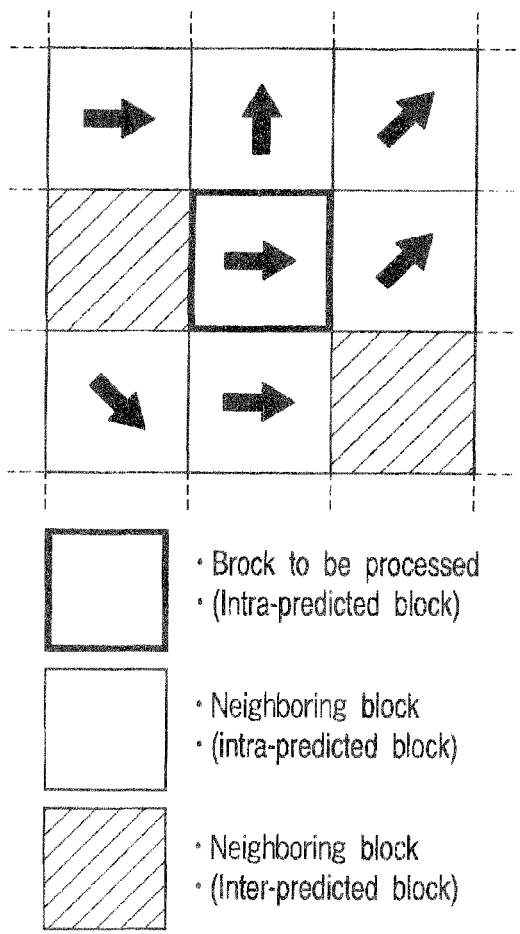
FIG. 4 is a view for explaining the operation using intra-prediction mode information as edge information in the processing shown in FIG. 3.

The aforementioned method is an example when the edge detection is executed. However, when a block to be processed and neighboring blocks are those encoded by intra-prediction, mode information (exemplified by an arrow in FIG. 4) of each neighboring block in an intra-prediction mode may be detected and used as edge information in step 3a.

Of the edge map generator/edge weighting coefficient generator 121, an edge weighting coefficient generator 121b converts each edge information included in the edge map generated by the edge map generator 121a into an edge weighting coefficient based on the edge information of a block that neighbors that block (block to be processed). More specifically, a degree of separation of the edge direction indicated by the edge information of the neighboring block with respect to that indicated by the edge information of the block to be processed is calculated as an edge weighting coefficient. For example, the edge weighting coefficient for the edge direction of the block to be processed is set to be zero, and a larger edge weighting coefficient is set for a direction separating farther away from this edge direction (that of the block to be processed).

That is, for example, when edges are classified into four directions every 90°, if the edge direction of the neighboring block falls within a range from 0° (inclusive) to 90° (exclusive) with respect to that of the block to be processed, an edge weighting coefficient is set to be zero. If the edge direction falls within a range from 90° (inclusive) to 180° (exclusive) or from 270° (inclusive) to 360° (exclusive), an edge weighting coefficient is set to be "1". If the edge direction falls within a range from 180° (inclusive) to 270° (exclusive), an edge weighting coefficient is set to be "2". In this case, the case has been explained wherein edges are classified into four directions. Even when edges are classified into direction more than four directions, the same concept applies.

Note that the edge weighting coefficient generator 121b stores weighting coefficients of respective blocks for at least two consecutive frames (moving image frame Ft and immediately preceding moving image frame Ft−1) into the internal memory.

The motion vector controller 122a determines a plurality of motion vector (predictive vector) candidates for each rectangular block that configures the interpolation frame Ft−0.5 based on the moving image frame Ft obtained by the moving image decoder 110, the edge weighting coefficients obtained by the edge map generator/edge weighting coefficient generator 121, and motion vectors of an interpolation frame Ft−1.5, which were stored in the motion vector storage unit 127 of the subsequent stage and were generated one frame before, and detects a motion vector from the plurality of candidates for each rectangular block.

That is, the motion vector controller 122a calculates motion vectors of respective rectangular blocks that configure the interpolation frame Ft−0.5. In order to implement such operation, the motion vector controller 122a comprises a predictive vector candidate determination unit 123a and motion vector detector 124.

Figure 5:
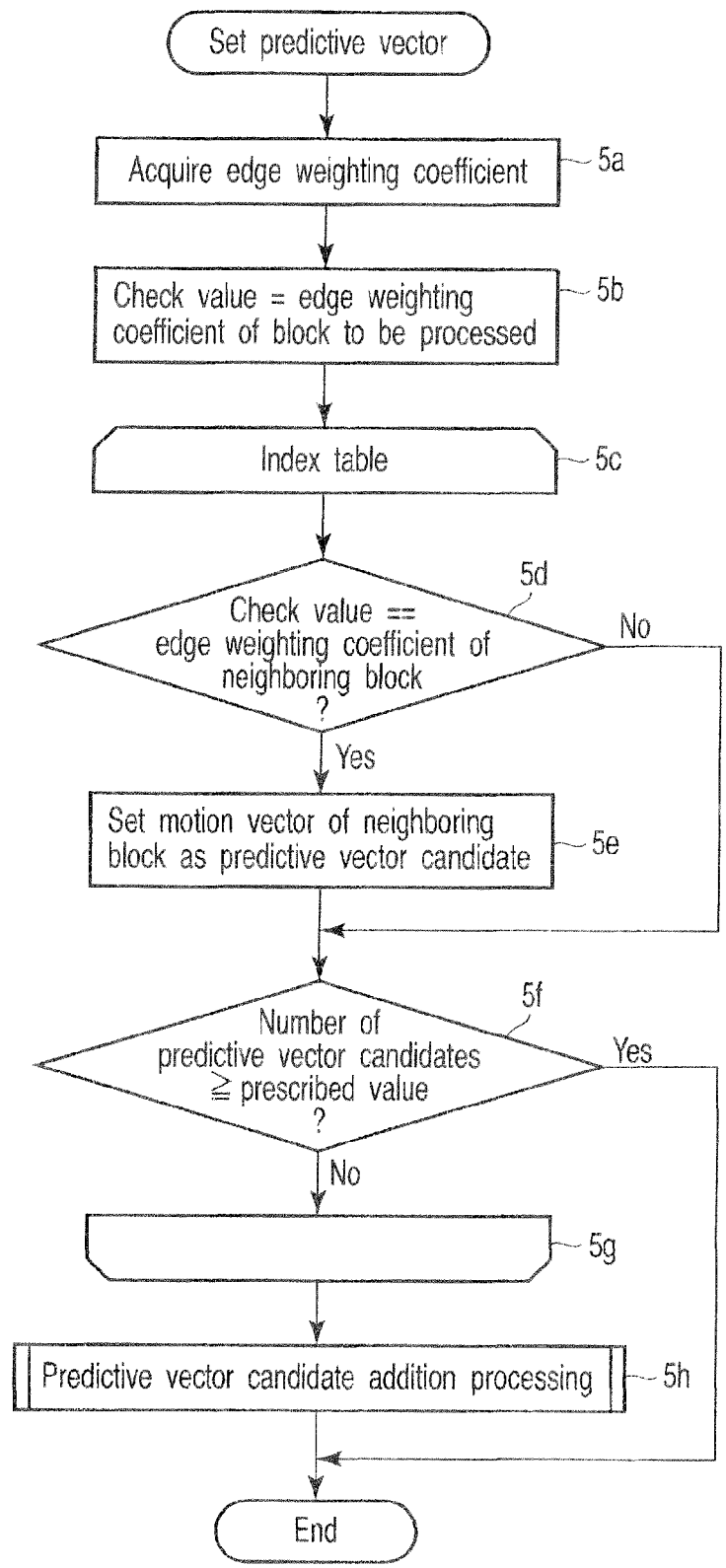
FIG. 5 is a flowchart for explaining the operation of a predictive vector candidate determination unit of the image processing apparatus shown in FIG. 2.
Figure 6:
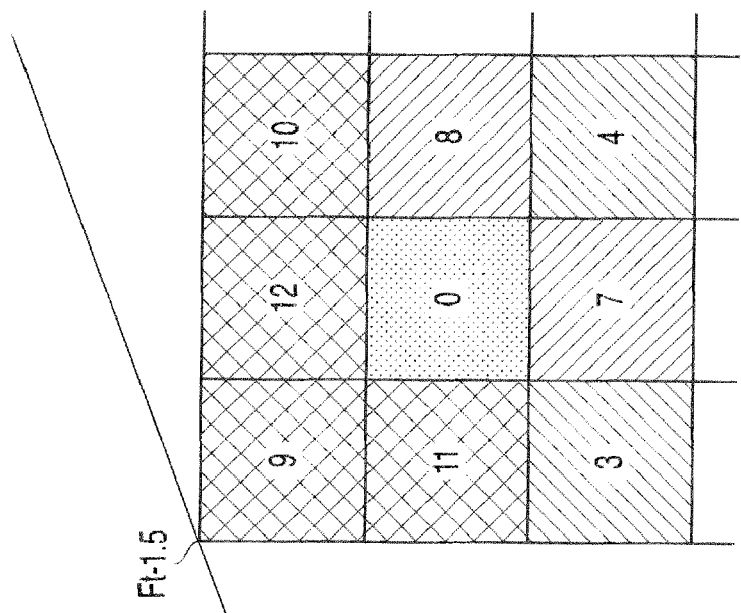
FIG. 6 is a view showing an example of an index table used in the processing shown in FIG. 5.
Figure 6:
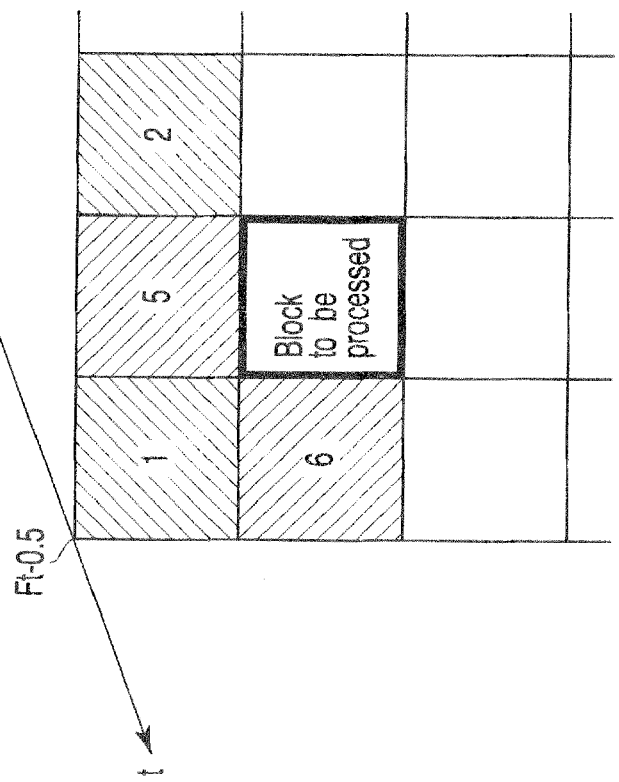
Figure 7:
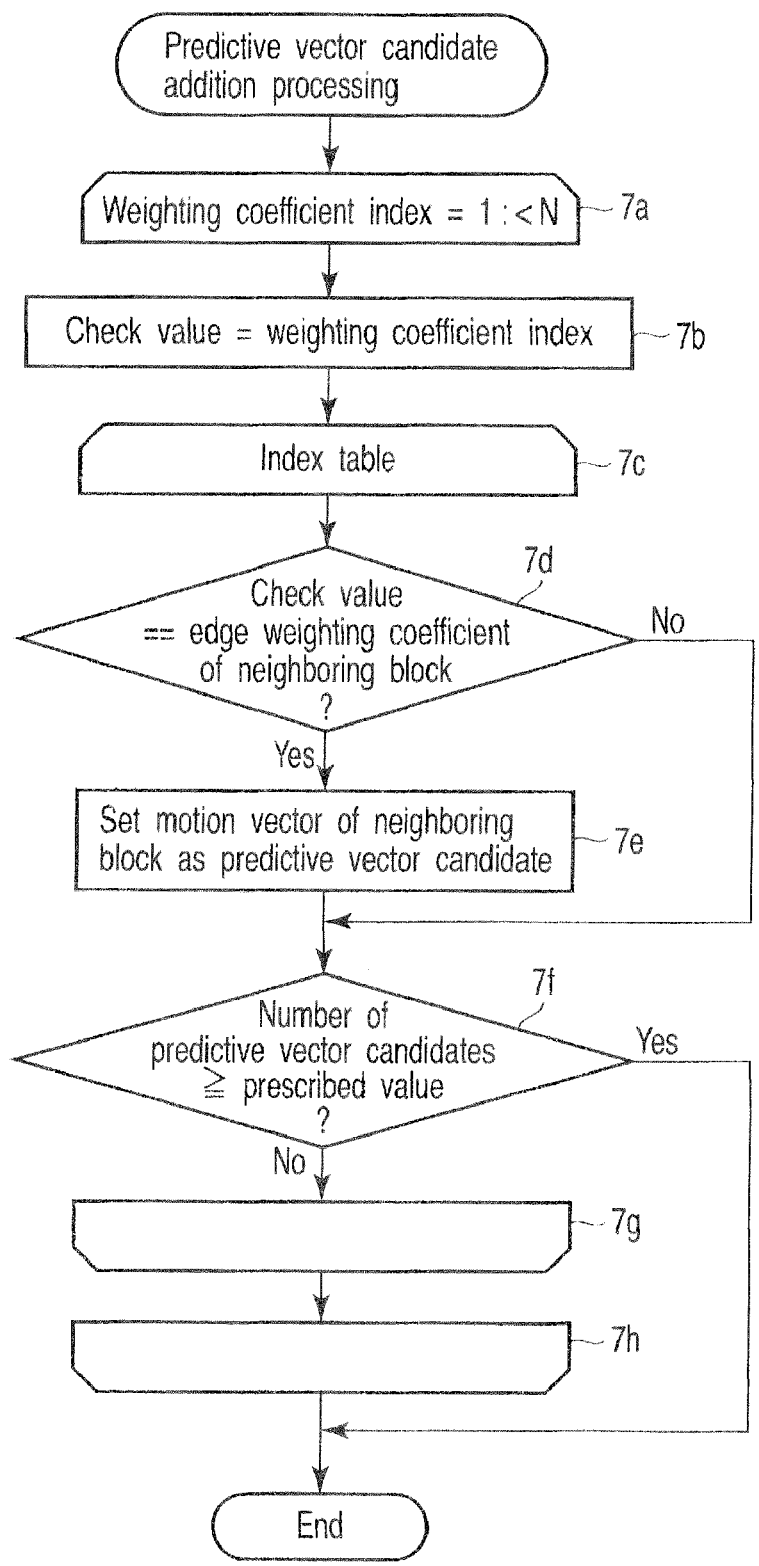
FIG. 7 is a flowchart for explaining the operation of the predictive vector candidate determination unit of the image processing apparatus shown in FIG. 2.

More specifically, the predictive vector candidate determination unit 123a determines a plurality of predictive vector candidates by executing processing shown in FIGS. 5 to 7 for one rectangular block that configures the interpolation frame Ft−0.5. Then, the motion vector detector 124 determines a predictive vector (motion vector) of that rectangular block from the plurality of predictive vector candidates by executing processing shown in FIG. 8, and holds it in an internal memory of the motion vector detector 124. Such processing of the predictive vector candidate determination unit 123a and motion vector detector 124 is executed in a raster scan order for respective rectangular blocks, thereby calculating motion vectors of respective rectangular blocks that configure the interpolation frame Ft−0.5.

The operation of the predictive vector candidate determination unit 123a will be described in more detail below with reference to FIGS. 5 to 7. Upon reception of the moving image frame Ft, the predictive vector candidate determination unit 123a executes the processing shown in FIG. 5 for respective rectangular blocks that configure the interpolation frame Ft−0.5 in a raster scan order.

In step 5a, the predictive vector candidate determination unit 123a notifies the edge map generator/edge weighting coefficient generator 121 of a block index of a block as an object to be processed (to be referred to as a block to be processed) of rectangular blocks that configure the interpolation frame Ft−0.5. In response to this, the edge map generator/edge weighting coefficient generator 121 outputs, to the predictive vector candidate determination unit 123a, an edge weighting coefficient of a rectangular block corresponding to the block index received from the predictive vector candidate determination unit 123a of those calculated for respective rectangular blocks that configure the moving image frame Ft. Upon acquiring the edge weighting coefficient, the predictive vector candidate determination unit 123a sets a counter Nc of the number of candidates for that block to be processed to be zero, and the process advances to step 5b.

In step 5b, the predictive vector candidate determination unit 123a sets the edge weighting coefficient acquired in step 5a as a check value, and the process advances to step 5c.

Processes in steps 5c and 5g correspond to loop processing for selecting a block that neighbors the block to be processed (to be referred to as a neighboring block hereinafter) one by one as an object to be checked with reference to an index table, which is set in advance, according to the order indicated by this table. For each selected neighboring block, processes in steps 5d to 5f are executed. For this purpose, in step 5c the predictive vector candidate determination unit 123a selects one index of the neighboring block with reference to the index table.

FIG. 6 shows an example of the index table. In FIG. 6, an interpolation frame Ft−1.5 indicates an interpolation frame which was generated one frame before with respect to the interpolation frame Ft−0.5, which is currently generated, and motion vectors of respective blocks are stored in the motion vector storage unit 127. Also, in the interpolation frame Ft−0.5, motion vectors which have already been detected are held in a memory of the motion vector detector 124 of the subsequent stage. Numerical values 0 to 12 in blocks indicate the order of selection in the above loop processing, and the index table records this information.

In step 5c, the predictive vector candidate determination unit 123a selects a block "0" at the same position on the previous interpolation frame Ft−1.5 first. After that, the unit 123a selects blocks assigned "1" to "4" which belong to a neighboring block group A in turn. The blocks that belong to this block group A are present at symmetric positions to have a target block as the center. After that, the unit 123a selects blocks assigned "5" to "8" which belong to a neighboring block group B in turn. The blocks that belong to this block group B are present at symmetric positions to have the target block as the center. Then, the unit 123a selects blocks "9" to "12" which belong to a remaining block group C in turn. According to such index table, motion vectors with higher similarities can be preferentially selected as candidates.

Since the blocks "1", "5", "2", and "6" of the interpolation frame Ft−0.5 have already undergone this processing in the raster scan order, their motion vectors have already been detected by previous processes of the motion vector detector 124, and are held in the memory of the motion vector detector 124. Also, for the blocks "9", "12", "10", "11", "0", "8", "3", "7", and "4" of the interpolation frame Ft−1.5, motion vectors were detected by the immediately preceding interpolation processing, and were stored in the motion vector storage unit 127.

The predictive vector candidate determination unit 123a may use motion vectors of the moving image frame Ft−1 in place of or together with those of the interpolation frame Ft−1.5. In this case, in order to divert the motion vectors generated from the moving image stream upon configuring the moving image frame Ft−1 in the moving image decoder 110, these motion vectors are stored in the motion vector storage unit 127 (the dashed arrow in FIG. 2). In the index table, block indices of the moving image frame Ft−1 are set in place of or together with those of the interpolation frame Ft−1.5. In step 5c, the predictive vector candidate determination unit 123a sequentially selects the motion vectors of the moving image frame Ft−1 stored in the motion vector storage unit 127 in accordance with the index table so as to detect predictive vector candidates.

In step 5d, the predictive vector candidate determination unit 123a notifies the edge map generator/edge weighting coefficient generator 121 of the index selected in step 5c. In response to this, the edge map generator/edge weighting coefficient generator 121 outputs, to the predictive vector candidate determination unit 123a, an edge weighting coefficient of a rectangular block corresponding to the index received from the predictive vector candidate determination unit 123a of those calculated for respective rectangular blocks that configure the moving image frame Ft or Ft−1. The predictive vector candidate determination unit 123a acquires this edge weighting coefficient, and checks if this edge weighting coefficient is equal to the check value set in step 5b. If these two values are equal to each other, the process advances to step 5e; otherwise, the process jumps to step 5f.

In step 5e, the predictive vector candidate determination unit 123a sets the motion vector of the neighboring block (that corresponding to the index selected in step 5c), the edge weighting coefficient of which is determined in step 5d to be equal to the check value, as a predictive vector candidate. The unit 123a increments the candidate count Nc by 1, and the process advances to step 5f. In the example of FIG. 6, in case of rectangular blocks corresponding to indices "1", "5", "2", and "6" selected in step 5c, the unit 123a acquires motion vectors from the motion vector detector 124, and sets them as predictive vector candidates. On the other hand, in case of rectangular blocks corresponding to indices "9", "12", "10", "11", "0", "8", "3", "7", and "4" selected in step 5c, the unit 123a acquires motion vectors from the motion vector storage unit 127, and sets them as predictive vector candidates.

The predicted vector candidate determination unit 123a checks in step 5f if the candidate count Nc of predictive vectors for the block to be processed is equal to or larger than a prescribed value which is set in advance. If the candidate count Nc is equal to or larger than the prescribed value, the unit 123a ends the processing for the block to be processed; if the candidate count Nc is less than the prescribed value, the process advances to step 5g.

If it is determined in step 5g that neighboring blocks which are to undergo the processes in steps 5d to 5f still remain, the process returns to step 5c. In step 5c, the predicted vector candidate determination unit 123a selects an index of the remaining neighboring block, and executes the processes from step 5d. If no such neighboring block remains, the process advances to step 5h.

The process defined in Step 5h is executed to add predictive vector candidates when the candidate count Nc of predictive vectors is less than the prescribed value. In step 5h, the predicted vector candidate determination unit 123a adds predictive vector candidates by executing processing shown in FIG. 7. This processing will be described below with reference to FIG. 7.

Note that this processing selects all weighting coefficients (N types) in turn as a processing target. Processes in steps 7a to 7h correspond to loop processing for selecting all weighting coefficients in turn one by one, and processes in steps 7b to 7g are executed for each selected weighting coefficient. For this purpose, in step 7a the predicted vector candidate determination unit 123a selects indices of weighting coefficients one by one in ascending order.

In step 7b, the predicted vector candidate determination unit 123a sets a weighting coefficient of the index selected in step 7a as a check value, and the process advances to step 7c. That is, the edge weighting coefficient of the block to be processed is set as the check value in the processing shown in FIG. 5, while all weighting values are set as the check value in turn in ascending order in the processing shown in FIG. 7.

Processes in steps 7c and 7g correspond to loop processing for selecting a block that neighbors the block to be processed (neighboring block) one by one as an object to be checked with reference to an index table, which is set in advance, according to the order indicated by this table, and processes in steps 7d to 7f are executed for each selected neighboring block. For this purpose, in step 7c the predicted vector candidate determination unit 123a selects one index of a neighboring block with reference to the index table. Note that the index table shown in FIG. 6 may be used as in the processing shown in FIG. 5.

In step 7d, the predicted vector candidate determination unit 123a notifies the edge map generator/edge weighting coefficient generator 121 of the index selected in step 7c. In response to this, the edge map generator/edge weighting coefficient generator 121 outputs, to the predicted vector candidate determination unit 123a, an edge weighting coefficient of a rectangular block corresponding to the index received from the predictive vector candidate determination unit 123a of those calculated for respective rectangular blocks that configure the moving image frame Ft or Ft−1. The predicted vector candidate determination unit 123a acquires the edge weighting coefficient and checks if this edge weighting coefficient is equal to the check value set in step 7b. If the two values are equal to each other, the process advances to step 7e; otherwise, the process jumps to step 7f.

In step 7e, the predictive vector candidate determination unit 123a sets the motion vector of the neighboring block (that corresponding to the index selected in step 7c), the edge weighting coefficient of which is determined in step 7d to be equal to the check value, as a predictive vector candidate. The unit 123a increments the candidate count Nc by 1, and the process advances to step 7f. In the example of FIG. 6, in case of rectangular blocks corresponding to indices "1", "5", "2", and "6" selected in step 7c, the unit 123a acquires motion vectors from the motion vector detector 124, and sets them as predictive vector candidates. On the other hand, in case of rectangular blocks corresponding to indices "9", "12", "10", "11", "0", "8", "3", "7", and "4" selected in step 7c, the unit 123a acquires motion vectors from the motion vector storage unit 127, and sets them as predictive vector candidates.

The predicted vector candidate determination unit 123a checks in step 7f if the candidate count Nc (the total value of candidates selected in steps 5e and 7e) of predictive vectors for the block to be processed is equal to or larger than a prescribed value which is set in advance. If the candidate count Nc is equal to or larger than the prescribed value, the unit 123a ends the processing for the block to be processed; if the candidate count Nc is less than the prescribed value, the process advances to step 7g.

If it is determined in step 7g that neighboring blocks which are to undergo the processes in steps 7d to 7f still remain, the process returns to step 7c. In step 7c, the predicted vector candidate determination unit 123a selects a remaining neighboring block, and executes the processes from step 7d. If no such neighboring block remains, the process advances to step 7h.

If it is determined in step 7h that weighting coefficients that are to undergo the processes in steps 7b to 7g still remain, the process returns to step 7a. In step 7a, the predicted vector candidate determination unit 123a selects a remaining weighting coefficient, and executes the processes from step 7b. If no such weighting coefficient remains, the unit 123a ends the processing for the block to be processed.

The motion vector detector 124 calculates predictive errors upon assigning the predictive vector candidates determined by the predicted vector candidate determination unit 123a to the block to be processed. The detector 124 then detects a predictive vector having a minimum evaluation value as a motion vector of that block based on the calculation result, and stores the detected motion vector in the memory of the motion vector detector 124.

Figure 8:
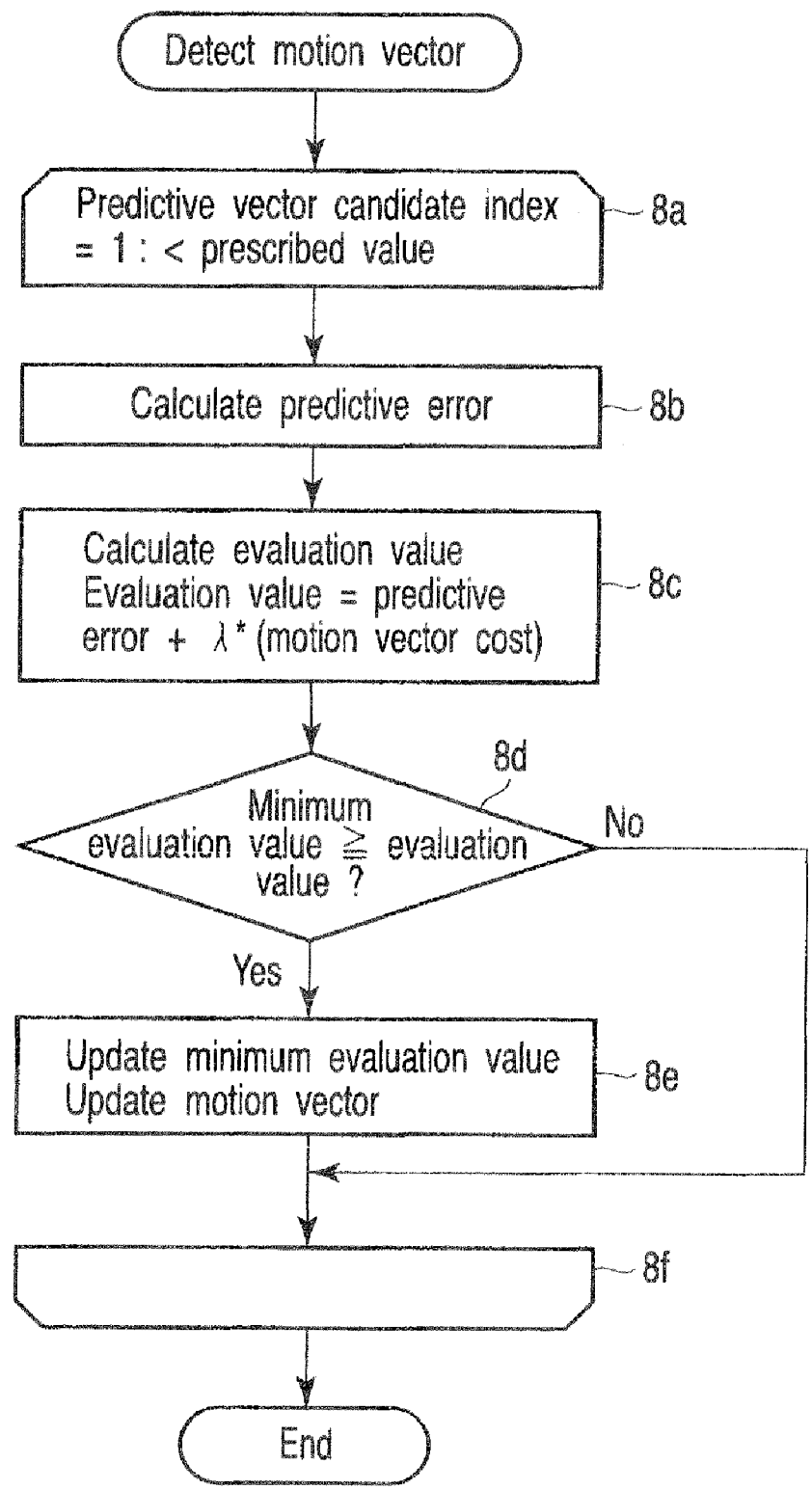
FIG. 8 is a flowchart for explaining the operation of a motion vector detector of the image processing apparatus shown in FIG. 2.

FIG. 8 shows an example of processing for calculating a minimum evaluation value. This processing is executed for each block. Note that processes in steps 8a to 8f correspond to loop processing for selecting the predictive vector candidates one by one in turn, and processes in steps 8b to 8e are executed for each selected predictive vector. For this purpose, in step 8a the motion vector detector 124 selects indices of the predictive vector candidates one by one in turn.

In step 8b, the motion vector detector 124 assigns the predictive vector candidate of the index selected in step 8a to the block to be processed on the interpolation frame. After that, the detector 124 calculates, as a predictive error, a difference between luminance values at destinations of symmetric transitions of the selected predictive vector toward the previous and next decoded image frames to have a time direction as an axis. Note that the predictive error may be a difference absolute value sum or square error sum of luminance values pointed by the motion vector. After that, the process advances to step 8c.

In step 8c, the motion vector detector 124 calculates an evaluation value using an evaluation formula, which is set in advance, and the process advances to step 8d. An example of the evaluation formula is expressed by:

Evaluation value=predictive error+λ*(motion vector cost)

Note that in this formula, the motion vector cost indicates an affinity between the predictive vector of the index selected in step 8a, and the motion vectors of neighboring blocks. That is, if the predictive vector and the motion vectors of the neighboring blocks are similar to each other, the value of the motion vector cost becomes smaller. Also, λ is a normalization coefficient used to adjust the dimensions of a distortion and the motion vector cost.

If the motion vector detector 124 determines in step 8d that the held minimum evaluation value is equal to or larger than the evaluation value calculated in step 8c, the process advances to step 8e; otherwise, the process jumps to step 8f. In an initial state of this processing, a sufficiently large value is used as a minimum evaluation value.

In step 8e, the motion vector detector 124 updates the minimum evaluation value by the evaluation value calculated in step 8c to hold that value, and the process advances to step 8f.

If the motion vector detector 124 determines in step 8f that the processes in steps 8b to 8e have been applied to all the predictive vectors, it holds the predictive vector corresponding to the evaluation value held last in step 8e in the memory of the motion vector detector 124 as a motion vector, thus ending the processing. On the other hand, if the processes have not been applied to all the predictive vectors yet, the process returns to step 8a to select an index of the next predictive vector to repeat the processes from step 8b.

The motion vector smoothing unit 125 applies smoothing processing to the motion vector detected by the motion vector detector 124 (that held in the memory of the motion vector detector 124) for each rectangular block to remove an impulse-noise-like motion vector. As an example of practical processing, the motion vector of a rectangular block as an object to be processed (to be referred to as a block to be smoothed hereinafter) and the motion vectors of rectangular blocks that neighbor the block to be smoothed are combined to form a candidate motion vector group W (MV1 to MVN). Of the candidate motion vector group W, a motion vector MVi (i changes in turn from 1 to N) as a base point is set, and distances from MVi to other candidate motion vectors MVj (MV1 to MVN) are calculated to calculate the sum (|MVi−MV1|+|MVi−MV2|+ . . . +|MVi−MVN|) of these distances. By changing MVi (i=1 to N), a motion vector with a minimum distance sum is output as a motion vector of the block to be smoothed (to be referred to as a smoothed motion vector hereinafter). That is, the smoothed motion vector is calculated by:

$$\text{Smoothed motion vector} = \underset{MVi \in W}{\operatorname{argmin}} \sum_{j=1}^{N} |MVi - Mvj|$$

Note that the neighboring blocks could be blocks neighboring in the time direction and blocks neighboring in the spatial direction. Of these blocks, the motion vector of one block may be referred to, or the motion vectors of both blocks may be referred to.

The α-blending unit 128 calculates a reliability of the smoothed motion vectors based on the smoothed motion vectors smoothed by the motion vector smoothing unit 125 using the statistical amount of an image, distortion, and continuity of motion vectors. The α-blending unit 128 generates compensation blocks that configure an interpolation frame based on the reliability. Then, the unit 128 generates the interpolation frame Ft−0.5 by compositing corresponding ones of these blocks. Note that upon this composition, the unit 128 composites blocks at a composition ratio based on the reliability.

The display driver 130 stores the moving image frame Ft supplied from the moving image decoder 110 and the interpolation frame Ft−0.5 supplied from the frame interpolation unit 120a in a buffer memory, and alternately outputs these frames to the display unit 20. The moving image frame Ft and Interpolation frame Ft−0.5 respectively have a frame rate of 15 frames per second. However, when the display driver 130 alternately outputs these frames, moving image data at a frame rate of 30 frames per second can be output. The display unit 20 displays moving image data at a frame rate of 30 frames per second.

As described above, the image processing apparatus with the above arrangement executes edge detection for each of blocks that configure the moving image frame Ft, and calculates correlations between the edges of the respective blocks and those of neighboring blocks as edge weighting coefficients. The apparatus calculates a plurality of motion vector candidates for each block based on this edge weighting coefficient, and obtains a candidate with a small evaluation value based on the predictive error and motion vector cost as a motion vector, thus generating the interpolation frame Ft–0.5.

Therefore, according to the image processing apparatus with the above arrangement, since an edge is detected for each block in place of pixels, the processing load can be reduced, and processing performance required for a processor can be lower than the conventional method. Since the motion vector candidates are calculated in consideration of the correlation with a neighboring block for that edge, the precision can be improved to some extent, and an interpolation frame with sufficiently high precision in practical use can be generated.

Second Embodiment

A mobile wireless apparatus to which an image processing apparatus according to the second embodiment of the present invention is applied will be described below. Here, this mobile wireless apparatus according to the second embodiment has the same structure as shown in FIG. 1, therefore, an explanation specific to the second embodiment will be mainly explained below.

In the mobile wireless apparatus of the second embodiment, the control unit 100 comprises an image processor 100b shown in FIG. 9. This image processor 100b decodes broadcast data obtained by the broadcast reception unit 60, applies image processing to the decoding result, and displays the broadcast moving image on the display unit 20 by interpolating frames in those of the moving image. The image processor 100b comprises, for example, a moving image decoder 110, frame interpolation unit 120b, and display driver 130, as shown in FIG. 9. In addition, the image processor 100b comprises an audio decoder (not shown) which decodes audio data received by the broadcast reception unit 60 to obtain a broadcast audio signal. Note that differences from the image processor 100a shown in FIG. 2 will be mainly explained below.

The moving image decoder 110 decodes encoded data (Video Elementary Stream) of a moving image, thereby obtaining moving image data including a plurality of moving image frames. Note that the frame rate of the moving image data obtained at that time is 15 frames per second. The moving image data is output to the frame interpolation unit 120h and display driver 130.

In the moving image decoding processing executed by the moving image decoder 110, reference information indicating a moving image frame to be referred to upon decoding, encoded image data, encoded motion vectors, and the like are extracted from the received encoded stream, and obtains image data by executing decoding processing based on them. Subsequently, the moving image decoder 110 generates a moving image frame by combining the image data obtained according to the received encoded stream and image data obtained from a reference image frame according to the reference information. Note that the description of this decoding processing corresponds to a case in which moving image frames are inter-encoded. However, when moving image frames are intra-encoded, since other frames need not be referred to, a moving image frame is obtained by decoding encoded image data contained in the received encoded stream.

The frame interpolation unit 120b generates an interpolation frame to be interpolated between a moving image frame Ft and an immediately preceding moving image frame Ft–1 obtained by the moving image decoder 110. For example, the unit 120b generates an interpolation frame Ft–0.5, which is located at a temporally middle position between the frames Ft and Ft–1. The frame interpolation unit 120b comprises an edge map generator/edge weighting coefficient generator 121, motion vector controller 122b, motion vector smoothing unit 125, motion vector storage unit 127, and α-blending unit 128.

Of the edge map generator/edge weighting coefficient generator 121, an edge map generator 121a generates an edge map by executing processing shown in FIG. 3. Of the edge map generator/edge weighting coefficient generator 121, an edge weighting coefficient generator 121b converts each edge information included in the edge map generated by the edge map generator 121a into an edge weighting coefficient based on the edge information of a block that neighbors that block (block to be processed).

The motion vector controller 122b determines a plurality of motion vector (predictive vector) candidates for each rectangular block that configures the interpolation frame Ft–0.5 based on the moving image frame Ft obtained by the moving image decoder 110, and motion vectors of an interpolation frame Ft–1.5, which were stored in the motion vector storage unit 127 of the subsequent stage and were generated one frame before, and detects a motion vector from the plurality of candidates for each rectangular block.

That is, the motion vector controller 122b calculates motion vectors of respective rectangular blocks that configure the interpolation frame Ft–0.5. In order to implement such operation, the motion vector controller 122b comprises a predictive vector candidate determination unit 123 and motion vector detector 124b.

Figure 10:
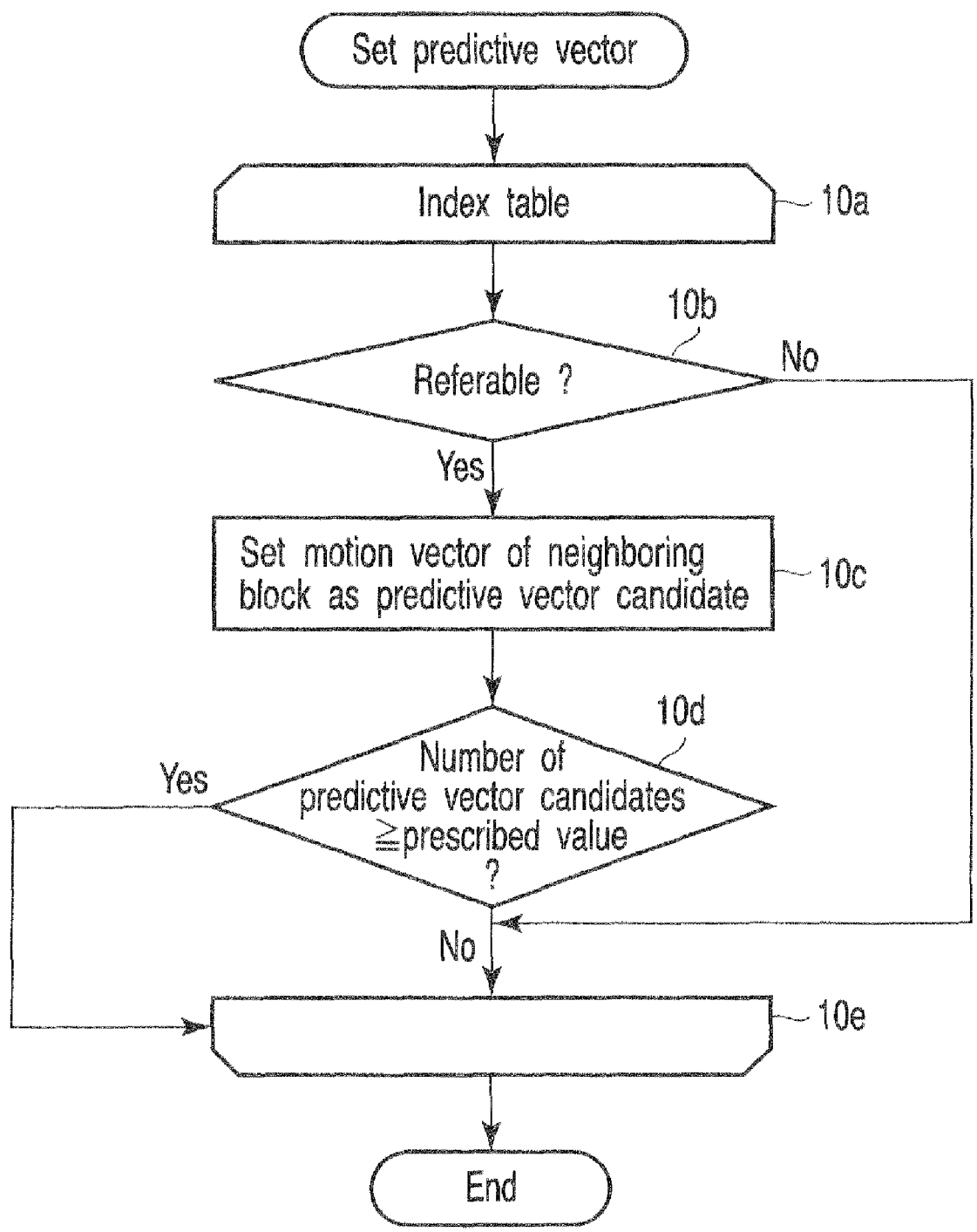
FIG. 10 is a flowchart for explaining the operation of a predictive vector candidate determination unit of the image processing apparatus shown in FIG. 9.

More specifically, the predictive vector candidate determination unit 123 determines a plurality of predictive vector candidates by executing processing shown in FIG. 10 for one rectangular block that configures the interpolation frame Ft–0.5. Then, the motion vector detector 124b determines a predictive vector (motion vector) of that rectangular block from the plurality of predictive vector candidates by executing processing shown in FIG. 11, and holds it in an internal memory of the motion vector detector 124b. Such processing of the predictive vector candidate determination unit 123 and motion vector detector 124b is executed in a raster scan order for respective rectangular blocks, thereby calculating motion vectors of respective rectangular blocks that configure the interpolation frame Ft–0.5.

The operation of the predictive vector candidate determination unit 123 will be described in more detail below with reference to FIG. 10. Upon reception of the moving image frame Ft, the predictive vector candidate determination unit 123 executes the processing shown in FIG. 10 for respective rectangular blocks that configure the interpolation frame Ft–0.5 in a raster scan order.

Processes in steps 10a and 10e correspond to loop processing for selecting neighboring blocks of the block to be processed one by one in turn as an object to be checked with reference to an index table, which is set in advance, according to the order indicated by this table, and processes in steps 10b to 10d are executed for each selected neighboring block. For this purpose, in step 10a the predictive vector candidate determination unit 123 selects one index of a neighboring block with reference to the index table. Note that the index table may use that shown in FIG. 6 as in the processing shown in FIG. 5.

For this purpose, in step 10a the predictive vector candidate determination unit 123 selects indices of neighboring blocks one by one in turn. In step 10a, the unit 123 sets a counter Nc of the number of candidates for the block to be processed to be zero, and the process advances to step 10b.

The predictive vector candidate determination unit 123 checks in step 10b if a motion vector of the neighboring block selected in step 10a is referable. If the motion vector is referable, the process advances to step 10c; otherwise, the process jumps to step 10e. Note that the motion vector is referable when the motion vector of the neighboring block has already been calculated by the motion vector detector 124b or is stored in the motion vector storage unit 127.

In step 10c, the predictive vector candidate determination unit 123 acquires the motion vector of the neighboring block selected in step 10a from the motion vector detector 124b or motion vector storage unit 127, and sets that vector as a predictive vector candidate. Also, the unit 123 increments the candidate count Nc by 1, and the process advances to step 10d.

The predictive vector candidate determination unit 123 may use motion vectors of the moving image frame Ft–1 in place of or together with those of the interpolation frame Ft–1.5. In this case, in order to divert the motion vectors generated from the moving image stream upon forming the moving image frame Ft–1 in the moving image decoder 110, these motion vectors are stored in the motion vector storage unit 127 (the dashed arrow in FIG. 9). In step 10c, the predictive vector candidate determination unit 123 sets a predictive vector candidate with reference to the motion vectors of the moving image frame Ft–1 stored in the motion vector storage unit 127.

The predictive vector candidate determination unit 123 checks in step 10d if the candidate count Nc of predictive vectors for the block to be processed is equal to or larger than a prescribed value which is set in advance. If the candidate count Nc is equal to or larger than the prescribed value, the unit 123 ends the processing for the block to be processed; if the candidate count Nc is less than the prescribed value, the process advances to step 10e.

If it is determined in step 10e that neighboring blocks which are to undergo the processes in steps 10b to 10d still remain, the process returns to step 10a. In step 10a, the predicted vector candidate determination unit 123 selects an index of the remaining neighboring block, and executes processes from step 10b. If no such neighboring block remains, the unit 123 ends this processing.

The motion vector detector 124b calculates predictive errors upon assigning these predictive vector candidates determined by the predicted vector candidate determination unit 123 to the block to be processed. The detector 124b then detects a predictive vector having a minimum evaluation value as a motion vector of that block based on the calculation result, and holds the detected motion vector in the memory of the motion vector detector 124b.

Figure 11:
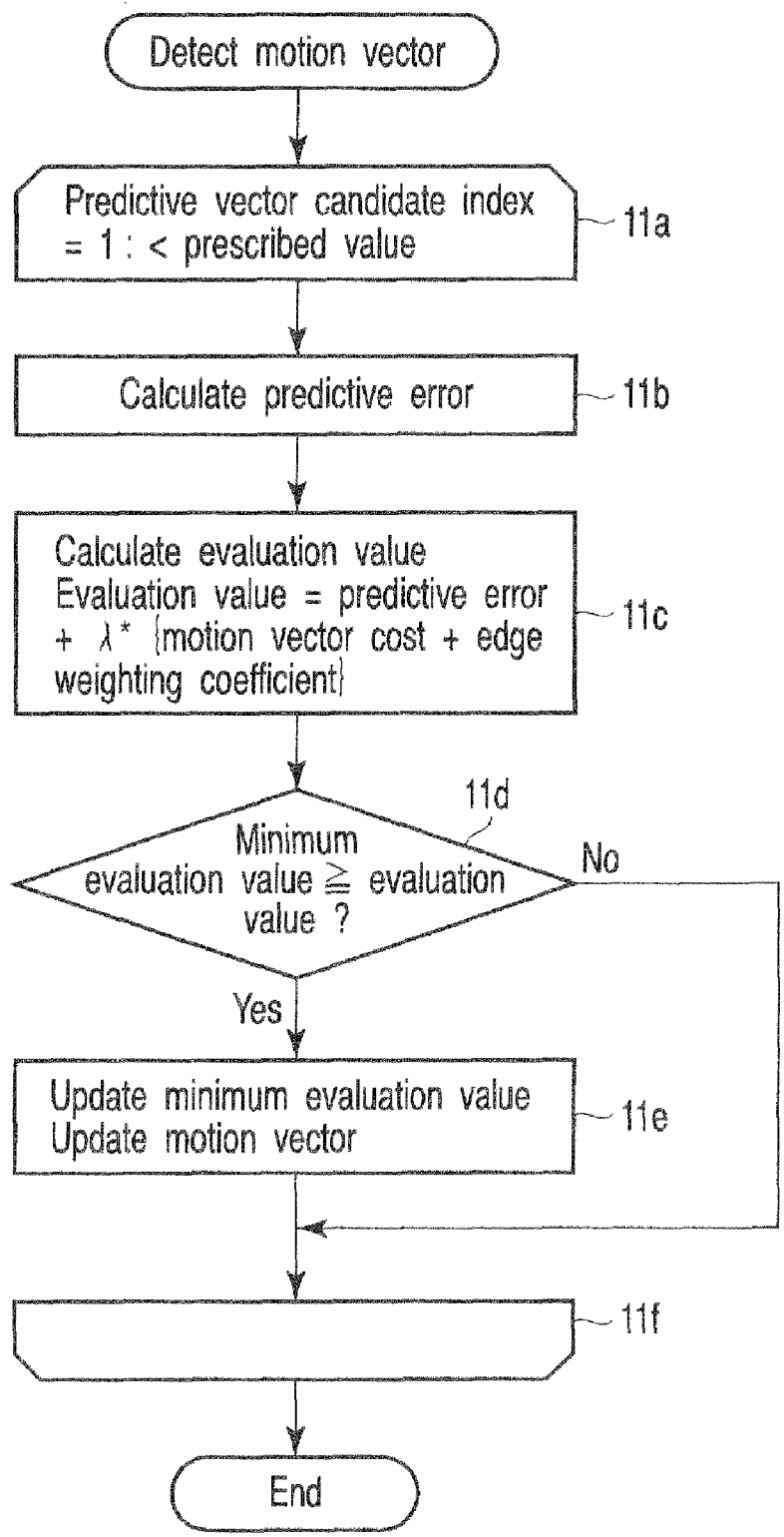
FIG. 11 is a flowchart for explaining the operation of a motion vector detection unit of the image processing apparatus shown in FIG. 9.

FIG. 11 shows an example of processing for calculating a minimum evaluation value. This processing is executed for each block. Note that processes in steps 11a to 11f correspond to loop processing for selecting the predictive vector candidates one by one in turn, and processes in steps 11b to 11e are executed for each selected predictive vector. For this purpose, in step 11a the motion vector detector 124b selects indices of the predictive vector candidates one by one in turn.

In step 11b, the motion vector detector 124b assigns the predictive vector candidate of the index selected in step 11a to the block to be processed on the interpolation frame. After that, the detector 124b calculates, as a predictive error, a difference between luminance values at destinations of symmetric transitions of the selected predictive vector toward the previous and next decoded image frames to have a time direction as an axis. Note that the predictive error may be a difference absolute value sum or square error sum of luminance values pointed by the motion vector. After that, the process advances to step 11c.

In step 11c, the motion vector detector 124b notifies edge map generator/edge weighting coefficient generator 121 of the index of the block to be processed, and acquires an edge weighting coefficient of the block to be processed from the edge map generator/edge weighting coefficient generator 121. The detector 124b then calculates an evaluation value using an evaluation formula, which is set in advance, and the process advances to step 11d. An example of the evaluation formula is expressed by:

$$\text{Evaluation value} = \text{predictive error} + \lambda *(\text{motion vector cost} + \text{edge weighting coefficient})$$

Note that in this formula, the motion vector cost indicates an affinity between the predictive vector of the index selected in step 11a, and the motion vectors of neighboring blocks. That is, if the predictive vector and the motion vectors of the neighboring blocks are similar to each other, the value of the motion vector cost becomes smaller. Also, $\lambda$ is a normalization coefficient used to adjust the dimensions of a distortion and the motion vector cost.

If the motion vector detector 124b determines in step 11d that the held minimum evaluation value is equal to or larger than the evaluation value calculated in step 11e, the process advances to step 11e; otherwise, the process jumps to step 11f. Note that in an initial state of this processing, a sufficiently large value is used as a minimum evaluation value.

In step 11e, the motion vector detector 124b updates the minimum evaluation value by the evaluation value calculated in step 11c to hold that value, and the process advances to step 11f.

If the motion vector detector 124b determines in step 11f that the processes in steps 11b to 11e have been applied to all the predictive vectors, it holds the predictive vector corresponding to the evaluation value held last in step 11e in the memory of the motion vector detector 124b as a motion vector, thus ending the processing. On the other hand, if the processes have not been applied to all the predictive vectors yet, the process returns to step 11a to select an index of the next predictive vector to repeat the processes from step 11b.

The motion vector smoothing unit 125 applies smoothing processing to the motion vector detected by the motion vector detector 124b (that held in the memory of the motion vector detector 124b) for each rectangular block to remove an impulse-noise-like motion vector, as described in the first embodiment.

The α-blending unit 128 calculates a reliability of the smoothed motion vectors based on the smoothed motion vectors smoothed by the motion vector smoothing unit 125 using the statistical amount of an image, distortion, and continuity of motion vectors. The α-blending unit 128 generates compensation blocks that configure an interpolation frame based on the reliability. Then, the unit 128 generates the interpolation frame Ft–0.5 by compositing corresponding ones of these blocks. Note that upon this composition, the unit 128 composites blocks at a composition ratio based on the reliability.

The display driver 130 stores the moving image frame Ft supplied from the moving image decoder 110 and the interpolation frame Ft−0.5 supplied from the frame interpolation unit 120b in a buffer memory, and alternately outputs these frames to the display unit 20. The moving image frame Ft and interpolation frame Ft−0.5 respectively have a frame rate of 15 frames per second. However, when the display driver 130 alternately outputs these frames, moving image data at a frame rate of 30 frames per second can be output. The display unit 20 displays moving image data at a frame rate of 30 frames per second.

As described above, the image processing apparatus with the above arrangement sets a motion vector of each neighboring block as a predictive vector candidate for each block that configures the moving image frame Ft. On the other hand, the apparatus executes edge detection for each of blocks that configure the moving image frame Ft, and calculates correlations between the edges of the respective blocks and those of neighboring blocks as edge weighting coefficients. The apparatus calculates a predicted value with a small evaluation value based on the prediction error, motion vector cost, and edge weighting coefficient of a plurality of motion vector candidates, thus generating the interpolation frame Ft−0.5.

Therefore, according to the image processing apparatus with the above arrangement, since an edge is detected for each block in place of pixels, the processing load can be reduced, and processing performance required for a processor can be lower than the conventional method. Since the motion vector of each block is determined in consideration of the correlation with a neighboring block for that edge, the precision can be improved to some extent, and an interpolation frame with sufficiently high precision in practical use can be generated.

Third Embodiment

A mobile wireless apparatus to which an image processing apparatus according to the third embodiment of the present invention is applied will be described below. Here, this mobile wireless apparatus according to the third embodiment has the same structure as shown in FIG. 1, therefore, an explanation specific to the third embodiment will be mainly explained below.

In the mobile wireless apparatus of the third embodiment, the control unit 100 comprises an image processor 100c shown in FIG. 12. This image processor 100c decodes broadcast data obtained by the broadcast reception unit 60, applies image processing to the decoding result, and displays the broadcast moving image on the display unit 20 by interpolating frames in those of the moving image. The image processor 100c comprises, for example, a moving image decoder 110, frame interpolation unit 120c, and display driver 130, as shown in FIG. 12. In addition, the image processor 100c comprises an audio decoder (not shown) which decodes audio data received by the broadcast reception unit 60 to obtain a broadcast audio signal. Note that differences from the image processor 10a shown in FIG. 2 will be mainly explained below.

The moving image decoder 110 decodes encoded data (Video Elementary Stream) of a moving image, thereby obtaining moving image data including a plurality of moving image frames. Note that the frame rate of the moving image data obtained at that time is 15 frames per second. The moving image data is output to the frame interpolation unit 120c and display driver 130.

The frame interpolation unit 120c generates an interpolation frame to be interpolated between a moving image frame Ft and an immediately preceding moving image frame Ft−1 obtained by the moving image decoder 110. For example, the unit 120c generates an interpolation frame Ft−0.5, which is located at a temporally middle position between the frames Ft and Ft−1. The frame interpolation unit 120c comprises an edge map generator/edge weighting coefficient generator 121, motion vector controller 122c, motion vector smoothing unit 125, motion vector correction unit 126, motion vector storage unit 127, and α-blending unit 128.

Of the edge map generator/edge weighting coefficient generator 121, an edge map generator 121a generates an edge map by executing processing shown in FIG. 3. Of the edge map generator/edge weighting coefficient generator 121, an edge weighting coefficient generator 121b converts each edge information included in the edge map generated by the edge map generator 121a into an edge weighting coefficient based on the edge information of a block that neighbors that block (block to be processed).

The motion vector controller 122c determines a plurality of predictive vector candidates for each rectangular block that configures the interpolation frame Ft−0.5 based on the moving image frame Ft obtained by the moving image decoder 110, and motion vectors of an interpolation frame Ft−1.5, which were stored in the motion vector storage unit 127 of the subsequent stage and were generated one frame before, and detects a motion vector from the plurality of candidates for each rectangular block. That is, the motion vector controller 122c calculates motion vectors of respective rectangular blocks that configure the interpolation frame Ft−0.5. In order to implement such operation, the motion vector controller 122c comprises a predictive vector candidate determination unit 123 and motion vector detector 124.

The predictive vector candidate determination unit 123 determines a plurality of predictive vector candidates by executing processing shown in FIG. 10 for one rectangular block that configures the interpolation frame Ft−0.5, as described in the second embodiment. Then, the motion vector detector 124 determines a predictive vector (motion vector) of that rectangular block from the plurality of predictive vector candidates by executing processing shown in FIG. 8, and holds it in the memory of the motion vector detector 124, as described in the first embodiment. Such processing of the predictive vector candidate determination unit 123 and motion vector detector 124 is executed in a raster scan order for respective rectangular blocks, thereby calculating motion vectors of respective rectangular blocks that configure the interpolation frame Ft−0.5.

The motion vector smoothing unit 125 applies smoothing processing to the motion vector detected by the motion vector detector 124 for each rectangular block to remove an impulse-noise-like motion vector, as described in the first embodiment.

Figure 13:
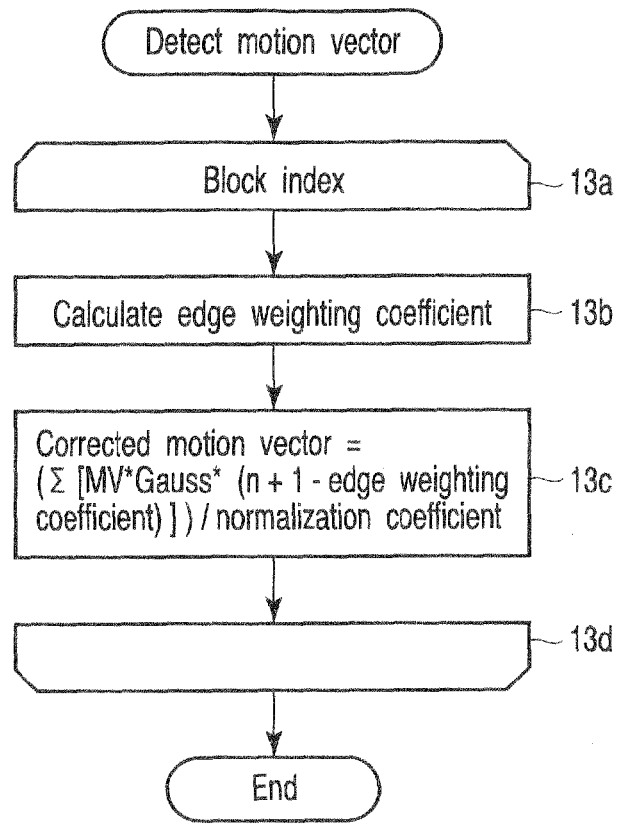
FIG. 13 is a flowchart for explaining the operation of a motion vector correction unit of the image processing apparatus shown in FIG. 12.

The motion vector correction unit 126 executes processing for correcting the motion vector smoothed by the motion vector smoothing unit 125 using, e.g., a Gaussian window. More specifically, the unit 126 executes motion vector correction processing shown in FIG. 13. The motion vector correction unit 126 executes the processing shown in FIG. 13 for each rectangular block that configures the interpolation frame Ft−0.5.

Processes in steps 13a to 13d correspond to loop processing for selecting rectangular blocks that configure the interpolation frame Ft−0.5 one by one in turn, and processes in steps 13b and 13c are executed for each selected block.

In step 13a, the motion vector correction unit 126 detects an index of a block as an object to be processed of the rectangular blocks which configure the interpolation frame Ft−0.5, and the process advances to step 13b.

In step 13b, the motion vector correction unit 126 notifies the edge map generator/edge weighting coefficient generator 121 of the index of the block selected in step 13a. In response to this, the edge map generator/edge weighting coefficient generator 121 outputs, to the motion vector correction unit 126, an edge weighting coefficient of a block corresponding to the index received from the motion vector correction unit 126 of those calculated for respective rectangular blocks that configure the moving image frame Ft. After the motion vector correction unit 126 acquires the edge weighting coefficient of the block to be processed, the process advances to step 13c.

Figure 14:
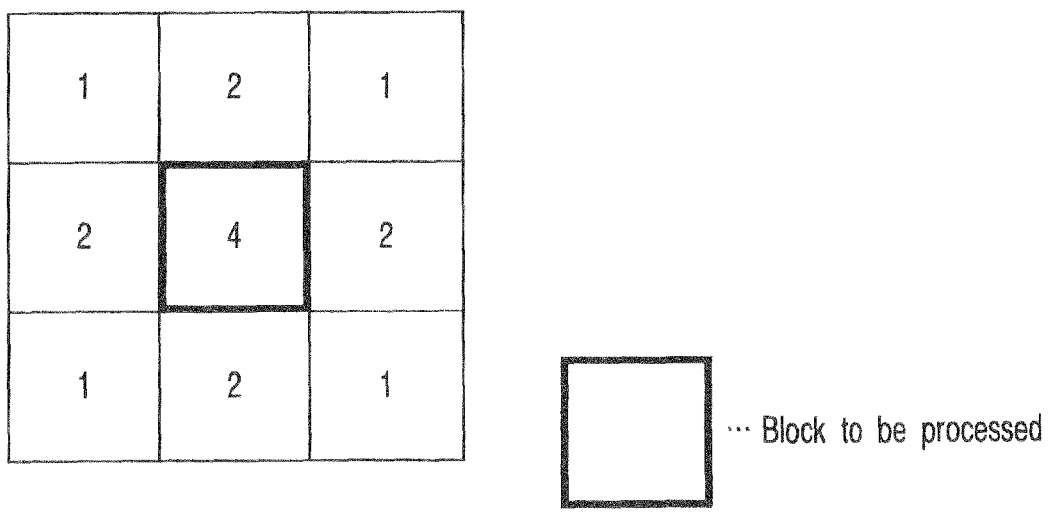
FIG. 14 is a view showing an example of an MV correction table used in the motion vector correction unit of the image processing apparatus shown in FIG. 12.

In step 13c, the motion vector correction unit 126 corrects the edge weighting coefficient acquired in step 13b based on an MV correction table so that motion vectors in an identical edge direction work dominantly. For example, the unit 126 uses:

Corrected motion vector=($\Sigma$[MV*MV correction table*(n+1−edge weighting coefficient)])/normalization coefficient Note that the MV correction table is set to have smaller weights for blocks separated farther away from a rectangular block to be corrected, as shown in, e.g., FIG. 14. Alternatively, the MV correction table may be set to have higher weights at positions of neighboring blocks having edges of directions having higher similarity, and to have lower weights at positions of neighboring blocks having edges of different directions. In the example of FIG. 14, neighboring blocks are referred to based on a 3×3 Gaussian window. However, the Gaussian window equal to or larger than this size may be used, or only upper, lower, right, and left neighboring blocks may be applied.

If the motion vector correction unit 126 determines in step 13d that the processes in steps 13b and 13c have been applied to all rectangular blocks that configure the interpolation frame Ft−0.5, it ends this processing. On the other hand, if the processes have not been applied to all rectangular blocks yet, the process returns to step 13a to select the next rectangular block.

The $\alpha$-blending unit 128 calculates a reliability of the smoothed motion vectors based on the smoothed motion vectors smoothed by the motion vector correction unit 126 using the statistical amount of an image, distortion, and continuity of motion vectors. The $\alpha$-blending unit 128 generates compensation blocks that configure an interpolation frame based on the reliability. Then, the unit 128 generates the interpolation frame Ft−0.5 by combining corresponding ones of these blocks. Note that upon this combination, the unit 128 combines blocks at a combination ratio based on the reliability.

The display driver 130 stores the moving image frame Ft supplied from the moving image decoder 110 and the interpolation frame Ft−0.5 supplied from the frame interpolation unit 120c in a buffer memory, and alternately outputs these frames to the display unit 20. The moving image frame Ft and interpolation frame Ft−0.5 respectively have a frame rate of 15 frames per second. However, when the display driver 130 alternately outputs these frames, moving image data at a frame rate of 30 frames per second can be output. The display unit 20 displays moving image data at a frame rate of 30 frames per second.

As described above, the image processing apparatus with the above arrangement sets a motion vector of each neighboring block as a predictive vector candidate for each block that composes the moving image frame Ft, and calculates a predicted value with a small evaluation value based on the predictive errors and motion vector cost as a motion vector. On the other hand, the apparatus executes edge detection for each of blocks that configure the moving image frame Ft, and calculates correlations between the edges of respective blocks and those of neighboring blocks as edge weighting coefficients. The apparatus corrects each motion vector based on the edge weighting coefficient, thus generating the interpolation frame Ft−0.5.

Therefore, according to the image processing apparatus with the above arrangement, since an edge is detected for each block in place of pixels, the processing load can be reduced, and processing performance required for a processor can be lower than the conventional method. Since the motion vector of each block is corrected by the edge weighting coefficient based on the correlation between the edges of that block and neighboring block, the precision can be improved to some extent, and an interpolation frame with sufficiently high precision in practical use can be generated.

Note that this invention is not limited to the embodiments intact, and it can be embodied by modifying required constituent elements without departing from the scope of the invention when it is practiced. Also, various inventions can be formed by appropriately combining a plurality of required constituent elements disclosed in the respective embodiments. For example, some required constituent elements may be omitted from all required constituent elements disclosed in the respective embodiments. Furthermore, required constituent elements of different embodiments may be appropriately combined.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus for generating an interpolation frame that interpolates between consecutive moving image frames, comprising:
    a motion vector storage unit which stores motion vectors for respective blocks that configure an interpolation frame;
    an edge detection unit which detects edges for respective blocks that configure a moving image frame;
    a correlation detection unit which calculates correlations with the edges of neighboring blocks for respective blocks based on the edges detected by the edge detection unit;
    a candidate determination unit which determines motion vector candidates from the motion vectors stored in the motion vector storage unit based on the correlations detected by the correlation detection unit for each of the blocks that configure the interpolation frame;
    a motion vector detection unit which detects a motion vector of each of the blocks that compose the interpolation frame from the candidates determined by the candidate determination unit; and
    a control unit which records the motion vectors detected by the motion vector detection unit in the motion vector storage unit.

2. The apparatus according to claim 1, wherein the edge detection unit detects the edge from mode information of a block of an intra-prediction mode of blocks which configure the moving image frame.

3. The apparatus according to claim 1, further comprises a second motion vector storage unit which stores second motion vectors used upon encoding the moving image frame, wherein the candidate determination unit determines the motion vector candidates from the motion vectors stored in the motion vector storage unit and the second motion vectors stored in the second motion vector storage unit based on the correlations detected by the correlation detection unit for each of the blocks that configure the interpolation frame.

4. An image processing apparatus for generating an interpolation frame that interpolates between consecutive moving image frames, comprising:
   an edge detection unit which detects edges for respective blocks that configure a moving image frame;
   a correlation detection unit which calculates correlations with the edges of neighboring blocks for respective blocks based on the edges detected by the edge detection unit;
   a motion vector storage unit which stores motion vectors for respective blocks that configure the interpolation frame;
   a candidate determination unit which determines motion vector candidates from the motion vectors of neighboring blocks stored in the motion vector storage unit;
   a motion vector detection unit which detects a motion vector of each of the blocks that compose the interpolation frame from the candidates determined by the candidate determination unit based on the correlations detected by the correlation detection unit; and
   a control unit which records the motion vectors detected by the motion vector detection unit in the motion vector storage unit.

5. The apparatus according to claim 4, further comprises a second motion vector storage unit which stores second motion vectors used upon encoding the moving image frame,
   wherein the candidate determination unit determines the motion vector candidates from the motion vectors stored in the motion vector storage unit and the second motion vectors stored in the second motion vector storage unit for each of the blocks that configure the interpolation frame.

6. An image processing apparatus for generating an interpolation frame that interpolates between consecutive moving image frames, comprising:
   an edge detection unit which detects edges for respective blocks that configure a moving image frame;
   a correlation detection unit which calculates correlations with the edges of neighboring blocks for respective blocks based on the edges detected by the edge detection unit;
   a motion vector storage unit which stores motion vectors for respective blocks that configure the interpolation frame;
   a candidate determination unit which determines motion vector candidates from the motion vectors of neighboring blocks stored in the motion vector storage unit;
   a motion vector detection unit which detects a motion vector of each of the blocks that configure the interpolation frame from the candidates determined by the candidate determination unit;
   a correction unit which corrects the motion vectors detected by the motion vector detection unit using the correlations calculated by the correlation detection unit; and
   a control unit which records the motion vectors corrected by the correction unit in the motion vector storage unit.

7. The apparatus according to claim 6, further comprises a second motion vector storage unit which stores second motion vectors used upon encoding the moving image frame,
   wherein the candidate determination unit determines the motion vector candidates from the motion vectors stored in the motion vector storage unit and the second motion vectors stored in the second motion vector storage unit for each of the blocks that configure the interpolation frame.

8. An image processing method for generating an interpolation frame that interpolates between consecutive moving image frames, comprising:
   a motion vector storage step of recording, in motion vector storage unit, motion vectors for respective blocks that configure an interpolation frame;
   an edge detection step of detecting edges for respective blocks that configure a moving image frame;
   a correlation detection step of calculating correlations with the edges of neighboring blocks for respective blocks based on the edges detected in the edge detection step;
   a candidate determination step of determining motion vector candidates from the motion vectors stored in the motion vector storage unit based on the correlations detected in the correlation detection step for each of the blocks that configure the interpolation frame;
   a motion vector detection step of detecting a motion vector of each of the blocks that compose the interpolation frame from the candidates determined in the candidate determination step; and
   a control step of recording the motion vectors detected in the motion vector detection step in the motion vector storage unit.

9. The method according to claim 8, wherein in the edge detection step, the edge is detected from mode information of a block of an intra-prediction mode of blocks which configure the moving image frame.

10. The method according to claim 8, further comprises a second motion vector storage step of storing, in second motion vector storage unit, second motion vectors used upon encoding the moving image frame,
    wherein the candidate determination step, the motion vector candidates are determined from the motion vectors stored in the motion vector storage unit and the second motion vectors stored in the second motion vector storage unit based on the correlations detected in the correlation detection step for each of the blocks that configure the interpolation frame.

11. An image processing method for generating an interpolation frame that interpolates between consecutive moving image frames, comprising:
    an edge detection step of detecting edges for respective blocks that configure a moving image frame;
    a correlation detection step of calculating correlations with the edges of neighboring blocks for respective blocks based on the edges detected in the edge detection step;
    a motion vector storage step of storing, in motion vector storage unit, motion vectors for respective blocks that configure the interpolation frame;
    a candidate determination step of determining motion vector candidates from the motion vectors of neighboring blocks stored in the motion vector storage unit;
    a motion vector detection step of detecting a motion vector of each of the blocks that compose the interpolation frame from the candidates determined in the candidate determination step based on the correlations detected in the correlation detection step; and
    a control step of recording the motion vectors detected in the motion vector detection step in the motion vector storage unit.

12. The method according to claim 11, further comprises a second motion vector storage step of storing, in second motion vector storage unit, second motion vectors used upon encoding the moving image frame, wherein the candidate determination step, the motion vector candidates are determined from the motion vectors stored in the motion vector storage unit and the second motion vectors stored in the second motion vector storage unit based on the correlations detected in the correlation detection step for each of the blocks that configure the interpolation frame.

13. An image processing method for generating an interpolation frame that interpolates between consecutive moving image frames, comprising:

an edge detection step of detecting edges for respective blocks that configure a moving image frame;

a correlation detection step of calculating correlations with the edges of neighboring blocks for respective blocks based on the edges detected in the edge detection step;

a motion vector storage step of storing, in motion vector storage unit, motion vectors for respective blocks that configure the interpolation frame;

a candidate determination step of determining motion vector candidates from the motion vectors of neighboring blocks stored in the motion vector storage unit;

a motion vector detection step of detecting a motion vector of each of the blocks that configure the interpolation frame from the candidates determined in the candidate determination step;

a correction step of correcting the motion vectors detected in the motion vector detection step using the correlations calculated in the correlation detection step; and a control step of recording the motion vectors corrected in the correction step in the motion vector storage unit.

14. The method according to claim 13, further comprises a second motion vector storage step of storing, in second motion vector storage unit, second motion vectors used upon encoding the moving image frame, wherein in the candidate determination step, the motion vector candidates are determined from the motion vectors stored in the motion vector storage unit and the second motion vectors stored in the second motion vector storage unit based on the correlations detected in the correlation detection step for each of the blocks that configure the interpolation frame.

\* \* \* \* \*